(12) United States Patent
Cavanaugh

(10) Patent No.: US 12,523,034 B2
(45) Date of Patent: *Jan. 13, 2026

(54) COLLAPSIBLE STRUCTURAL FRAME SYSTEM FOR A SHEET-LIKE BUILDING MATERIAL

(71) Applicant: ARMSTRONG WORLD INDUSTRIES, INC., Lancaster, PA (US)

(72) Inventor: Jason T. Cavanaugh, Lancaster, PA (US)

(73) Assignee: AWI Licensing LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/518,861

(22) Filed: Nov. 24, 2023

(65) Prior Publication Data

US 2024/0084580 A1 Mar. 14, 2024

Related U.S. Application Data

(63) Continuation of application No. 17/269,820, filed as application No. PCT/US2019/049020 on Aug. 30, 2019, now Pat. No. 11,859,379.

(Continued)

(51) Int. Cl.
*E04D 13/152* (2006.01)
*E04B 1/344* (2006.01)
(Continued)

(52) U.S. Cl.
CPC .............. *E04B 1/3441* (2013.01); *E04B 9/06* (2013.01); *E04D 13/15* (2013.01); *E04D 13/152* (2013.01);
(Continued)

(58) Field of Classification Search
None
See application file for complete search history.

(56) References Cited

U.S. PATENT DOCUMENTS

| 1,848,690 | A | * | 3/1932 | Bayley et al. | ............ E04B 1/08 |
| | | | | | 119/305 |
| 2,311,515 | A | * | 2/1943 | Bridge | .................... E04H 15/48 |
| | | | | | 135/153 |

(Continued)

FOREIGN PATENT DOCUMENTS

| JP | 05-321386 A | 12/1993 |
| JP | 08-260608 A | 10/1996 |
| JP | 2834060 B2 | 12/1998 |

*Primary Examiner* — Phi D A
*Assistant Examiner* — Phi D Tran
(74) *Attorney, Agent, or Firm* — Patrick Sheldrake

(57) ABSTRACT

A collapsible structural frame for forming a soffit having a multi-planar surface. The collapsible structural frame includes a first frame portion configured to receive a first sheet of building material, a second frame portion configured to receive a second sheet of building material, the second frame portion extending along a second reference plane, and a third frame portion configured to receive a third sheet of building material. The collapsible structural frame is alterable from: (1) a flat state in which the first, second, and third frame portions extend along the second reference plane in a linear arrangement; and (2) a deployed state in which the first frame portion is out of plane with the second reference plane and the third frame portion is out of plane with the second reference plane.

20 Claims, 9 Drawing Sheets

Related U.S. Application Data

(60) Provisional application No. 62/725,611, filed on Aug. 31, 2018.

(51) Int. Cl.
  E04B 9/06 (2006.01)
  E04D 13/158 (2006.01)
  E04D 13/15 (2006.01)
  E04G 1/14 (2006.01)
  E04G 17/00 (2006.01)
  E04G 17/14 (2006.01)

(52) U.S. Cl.
  CPC .............. *E04D 13/158* (2013.01); *E04G 1/14* (2013.01); *E04G 17/002* (2013.01); *E04G 17/14* (2013.01)

(56) References Cited

U.S. PATENT DOCUMENTS

| | | | |
|---|---|---|---|
| 2,697,932 A * | 12/1954 | Goodwin | E06B 1/702 49/504 |
| 2,715,558 A | 8/1955 | Bell | |
| 3,035,321 A * | 5/1962 | Victor | E04G 17/14 249/34 |
| 3,527,012 A * | 9/1970 | Hemminger | E04B 2/965 52/456 |
| 3,744,500 A * | 7/1973 | Briggs | A47C 29/006 135/912 |
| 3,894,377 A | 7/1975 | Welch | |
| 4,170,852 A | 10/1979 | Danis | |
| 4,315,455 A | 2/1982 | Shaklee | |
| 4,347,691 A * | 9/1982 | Lloyd-Jones | E04D 13/158 52/95 |
| 4,581,861 A * | 4/1986 | Eury | E04D 13/178 52/95 |
| 4,648,481 A * | 3/1987 | Lee | E06C 1/32 182/35 |
| 4,660,463 A * | 4/1987 | Bottomore | E04D 13/178 52/95 |
| 4,673,625 A | 6/1987 | McCartney | |
| 4,759,539 A * | 7/1988 | Nieppola | A63B 9/00 182/95 |
| 4,778,144 A * | 10/1988 | Gregory | E04G 11/38 264/33 |
| 4,884,658 A | 12/1989 | Banfield | |
| 5,086,872 A * | 2/1992 | Lin | E06C 1/32 182/20 |
| 5,107,957 A | 4/1992 | Bennett | |
| 5,131,492 A | 7/1992 | Caminiti | |
| 5,187,908 A | 2/1993 | Losensky | |
| 5,228,535 A * | 7/1993 | McCarty | E06C 1/52 182/163 |
| 5,802,778 A | 9/1998 | Thorp | |
| 5,893,616 A | 4/1999 | MacDonald | |
| 6,026,616 A * | 2/2000 | Gibson | E04D 13/158 52/302.1 |
| 6,780,099 B1 * | 8/2004 | Harper | E04D 3/38 52/95 |
| 7,185,738 B1 | 3/2007 | Clepper | |
| 7,703,402 B2 * | 4/2010 | Larcom | A47B 3/10 108/174 |
| 8,267,917 B2 | 9/2012 | Jabbour | |
| 8,429,858 B1 * | 4/2013 | Robinson | E04H 1/005 52/63 |
| 9,109,365 B2 | 8/2015 | McCoy | |
| 10,844,618 B2 | 11/2020 | White | |
| 10,898,003 B2 | 1/2021 | Samaraweera | |
| 10,995,548 B2 | 5/2021 | Cornthwaite | |
| 11,204,050 B2 | 12/2021 | Kennedy | |
| 2005/0274302 A1 * | 12/2005 | Jin | A47B 3/087 108/126 |
| 2006/0011106 A1 | 1/2006 | Hauck | |
| 2012/0279142 A1 | 11/2012 | Michaud | |
| 2012/0280549 A1 | 11/2012 | Goldszer | |
| 2014/0157714 A1 | 6/2014 | Richardson | |
| 2020/0154898 A1 | 5/2020 | Samaraweera | |

* cited by examiner

COLLAPSIBLE STRUCTURAL FRAME SYSTEM FOR A SHEET-LIKE BUILDING MATERIAL

CROSS-REFERENCE TO RELATED APPLICATIONS

This application is a continuation of U.S. patent application Ser. No. 17/269,820, filed on Feb. 19, 2021, which is a national stage entry under 35 U.S.C. § 371 of PCT/US2019/049020, filed Aug. 30, 2019, which claims the benefit of priority to U.S. Provisional Patent Application Ser. No. 62/725,611, filed on Aug. 31, 2018, the entireties of which are incorporated herein by reference.

FIELD

The present invention relates to building systems. Particular embodiments of the invention relate to collapsible systems for forming the structure of a soffit or similar framework. Particular embodiments provide the structure for holding drywall or other sheet-like finish material.

BACKGROUND

Many office buildings and other buildings have interior designs that include areas of flat ceilings and walls. Some of these buildings also include soffits or other features that include multiple angles between relatively small flat areas. For example, an upper area of an occupiable building space at the junction between a wall and the ceiling can include a rectangular (or other shape) boxed out area having a vertical surface sometimes referred to as a facia and a horizontal surface that is known as a soffit. A structure is traditionally built and then drywall or some other building material (often a sheet material) is fastened to the structure.

A problem exists in that traditionally the structure of the soffit and facia is stick-built by a worker in the field from wood or metal studs or other stock pieces that need to be custom cut and fitted. This procedure is time consuming and requires significant care to ensure that all the appropriate angles and lengths are identical so that a uniform structure results.

Accordingly, embodiments of the invention provide a system for quickly and easily constructing a dimensionally uniform structural framework for a flat area, soffit, fascia, or other building area.

SUMMARY

Embodiments of the invention provide a solution to the above problem by allowing more flexibility in grid design and more flexibility in ceiling tile construction and arrangement.

In one aspect, a collapsible structural frame is provided that is configured to provide a structure to which building material sheets are attached to form a surface. The frame includes a first frame portion that corresponds to a first portion of the surface and is configured to receive a first sheet of the building material; a second frame portion that corresponds to a second portion of the surface and is configured to receive a second sheet of the building material; and a third frame portion that corresponds to a third portion of the surface and is configured to receive a third sheet of the building material. The collapsible frame structure may be alterable from: (1) a flat state in which the first, second, and third frame portions extend along the second reference plane in a linear arrangement in which the first frame portion extends linearly beyond a first end of the second frame portion and the third frame portion extends linearly beyond a second end of the second frame portion; to (2) a deployed state in which the first frame portion is out of plane with the second reference plane and the third frame portion is out of plane with the second reference plane. The collapsible structural frame may become locked in the deployed state.

In another aspect, the invention may be a method of forming a soffit from a collapsible structural frame, the method comprising: pivoting a first frame portion of the collapsible structural frame relative to a second frame portion of the collapsible structural frame until the first frame portion extends perpendicularly from a first side of the second frame portion to alter the first frame portion into a first deployed state; locking the first frame portion to the second frame portion to fix the first frame portion in the first deployed state; pivoting a third frame portion of the collapsible structural frame relative to the second frame portion of the collapsible structural frame until the third frame portion extends perpendicularly from a second side of the second frame portion that is opposite the first side of the first frame portion to alter the third frame portion into a second deployed state; and locking the third frame portion to the second frame portion to fix the third frame portion in the second deployed state.

In yet another aspect, the invention may be a collapsible structural frame for forming a soffit having a multi-planar surface, the collapsible structural frame comprising: a first frame portion configured to receive a first sheet of building material to form a first portion of the multi-planar surface; a second frame portion configured to receive a second sheet of building material to form a second portion of the multi-planar surface, the second frame portion extending along a second reference plane; wherein the collapsible structural frame is alterable from: (1) a flat state in which the first and second frame portions extend along the second reference plane in a linear arrangement; and (2) a deployed state in which the first frame portion extends perpendicularly from the second frame portion; and wherein upon altering the collapsible structural frame from the flat state to the deployed state, the first frame portion becomes locked to the second frame portion to fix a relative position of the first frame portion and the second frame portion.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
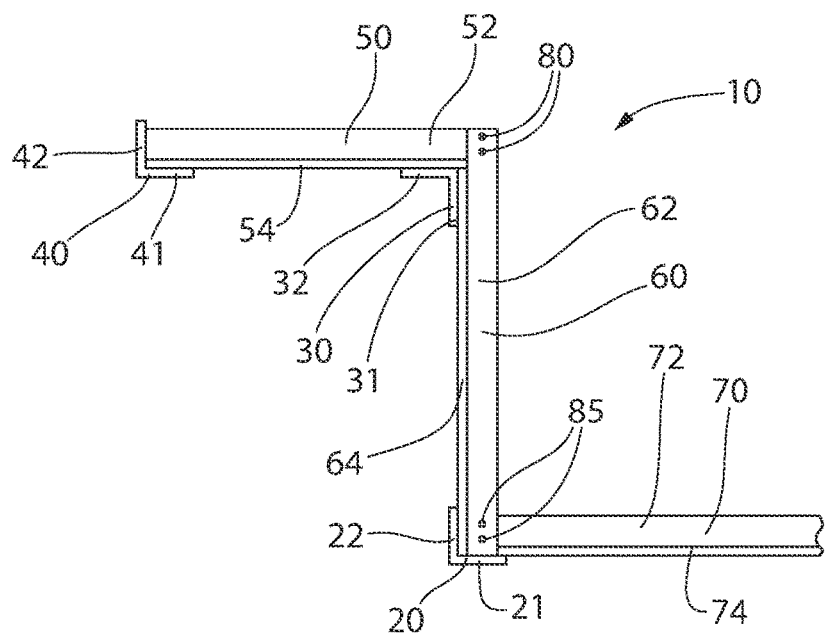
FIG. 1 is a side view of a conventional soffit structure.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

FIG. 1 shows an example of a traditional building structure for supporting drywall panels to form a soffit and facia. The thickness of some members in the figures is not to scale and are made thicker in proportion to other members for clarity. Actual members may be relatively thin sheet metal or other material such as wood, plastic, composite or other material.

Figure 2:
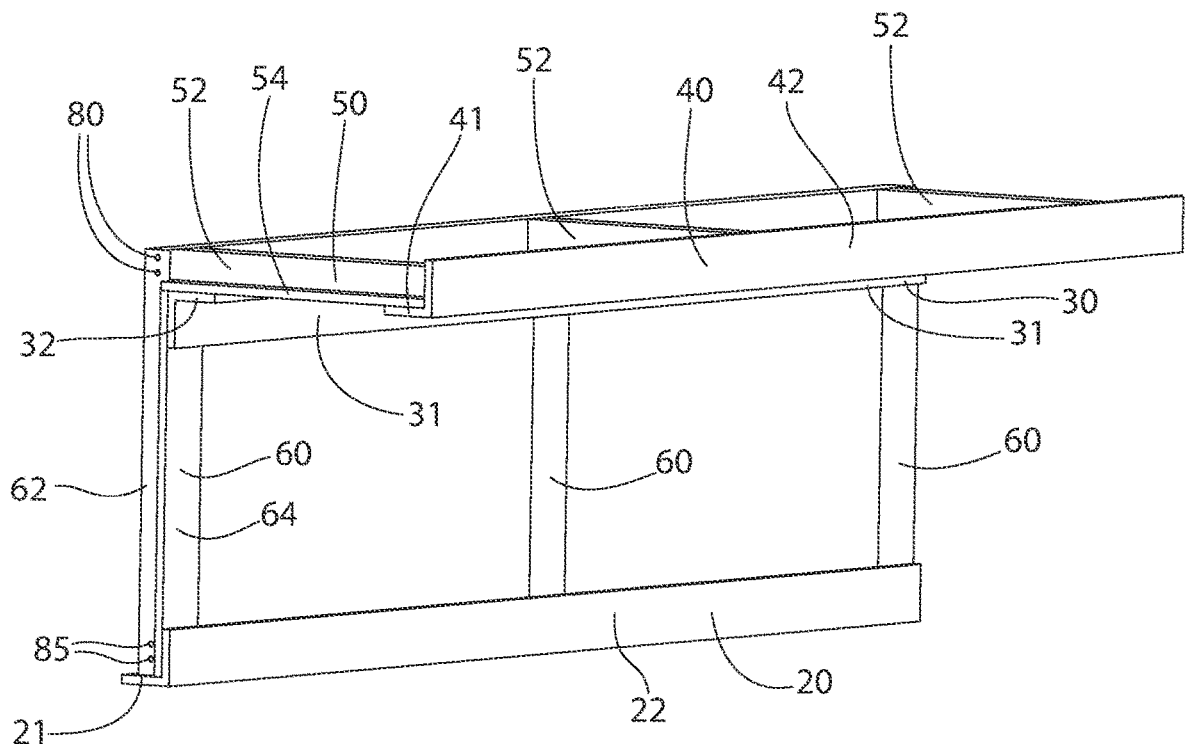
FIG. 2 is a perspective view of the structure of FIG. 1.
Figure 3:
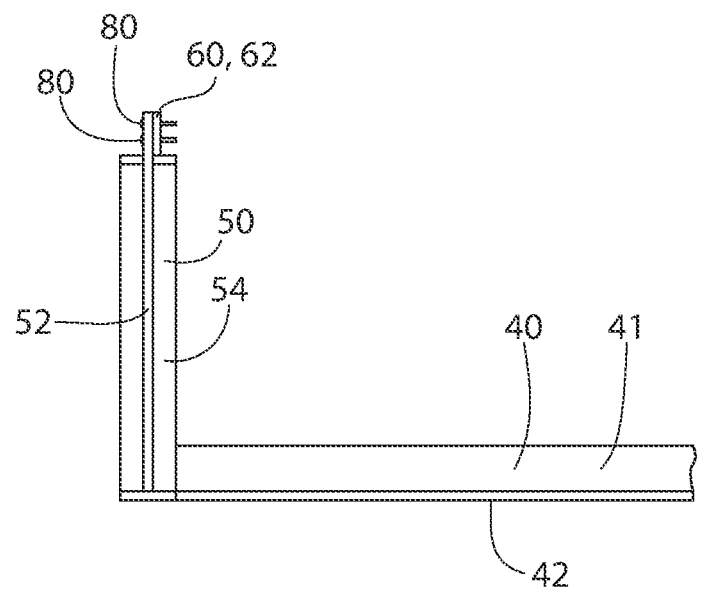
FIG. 3 is a top view of the structure of FIG. 1.

In FIG. 1, a structural frame 10 includes an upper horizontal section formed by members 50, a vertical section formed by members 60 and a lower horizontal section formed by members 70. In this example, the upper horizontal section and the vertical section intersect at a right angle, and the vertical section and the lower horizontal section intersect at a right angle. In other examples, different angles exist between the particular sections and the sections have different relative lengths. Members 50, 60, 70 are, in this example, longitudinal members having a "T" shaped cross section. Angles 20, 30, 40 are, in this example, longitudinal members having an "L" shaped cross section. Although FIGS. 1-3 show surfaces 54, 64, 74 being offset from surfaces 21, 22, 31, 32, 41, 42 by the thickness of angles 20, 30, 40, other examples are fabricated so that surfaces 54, 64, 74 are flush with surfaces 21, 22, 31, 32, 41, 42. In this example, member 50 is fixed to member 60 by two screws 80, and member 60 is fixed to member 70 by two screws 85.

The structural frame 10 may comprise a first frame portion that may form a first portion of the surface and is configured to receive a first sheet of the building material. The first frame portion may comprise a first longitudinal member 50 and a second longitudinal member 40, the first longitudinal member 50 arranged orthogonal to the second longitudinal member 40.

The first longitudinal member 50 may have a T-shaped cross-section. The T-shaped cross-section of the first longitudinal member 50 may comprise a bottom flange 54 that forms part of the first portion of the surface.

The second longitudinal member 40 may have an L-shaped cross-section. The L-shaped cross-section of the second longitudinal member 40 may comprise a bottom flange 64 that forms part of the first portion of the surface.

The structural frame 10 may comprise a second frame portion may form a second portion of the surface and is configured to receive a second sheet of the building material. The second frame portion may comprise a third longitudinal member 60 and a fourth longitudinal member 20, the third longitudinal member 60 arranged orthogonal to the fourth longitudinal member 20.

The third longitudinal member 60 may have a T-shaped cross-section. The T-shaped cross-section of the third longitudinal member 60 may comprise a bottom flange 64 that forms part of the first portion of the surface.

The fourth longitudinal member 20 may have an L-shaped cross-section. The L-shaped cross-section of the fourth longitudinal member 20 may comprise a bottom flange 22 that forms part of the first portion of the surface.

The structural frame 10 may comprise a third frame portion that corresponds to a third portion of the surface and is configured to receive a third sheet of the building material. The third frame portion may comprise a fifth longitudinal member 70. The fifth longitudinal member 70 may be arranged orthogonal to the fourth longitudinal member 20.

The fifth longitudinal member 70 may comprise a T-shaped cross-section. The T-shaped cross-section of the fifth longitudinal member 70 may comprises a bottom flange 74 that forms part of the third portion of the surface.

FIG. 2 is a perspective view of frame 10 and FIG. 3 is a top view of frame 10. These figures help illustrate the stick-built nature of this example of a traditional building structure for supporting drywall panels.

Figure 4:
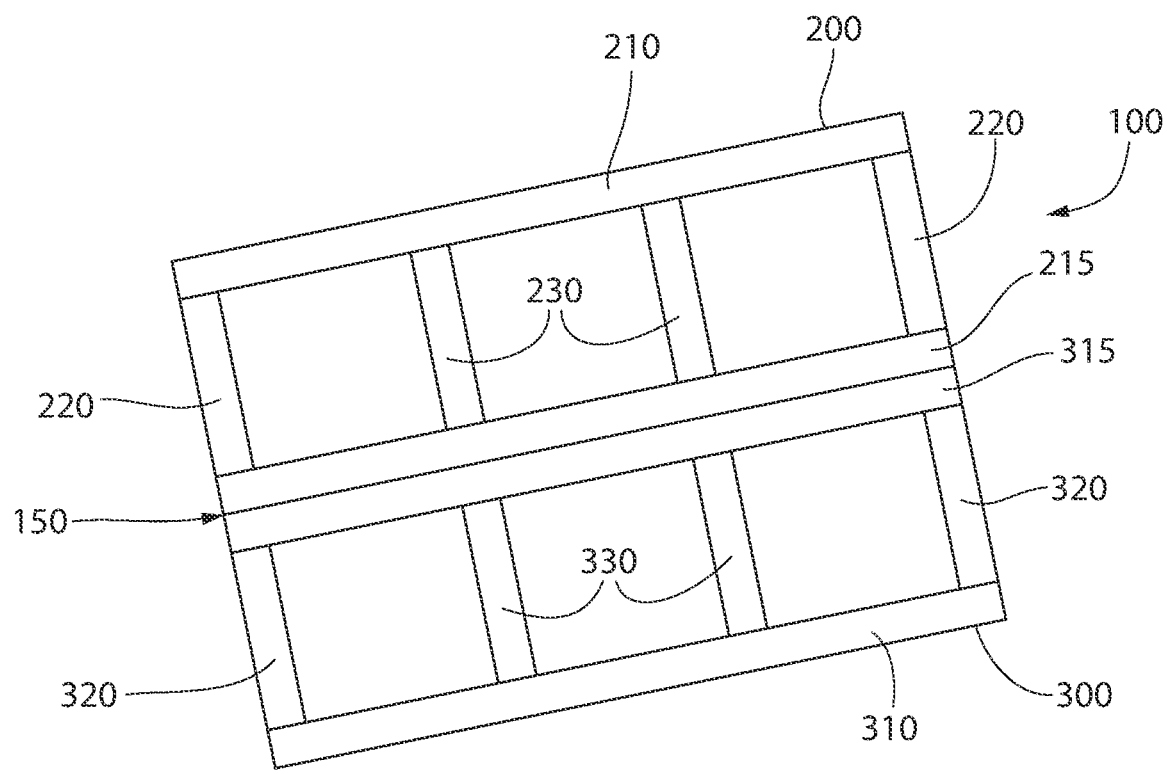
FIG. 4 is top view of a first embodiment of the invention in an unfolded state.
Figure 5:
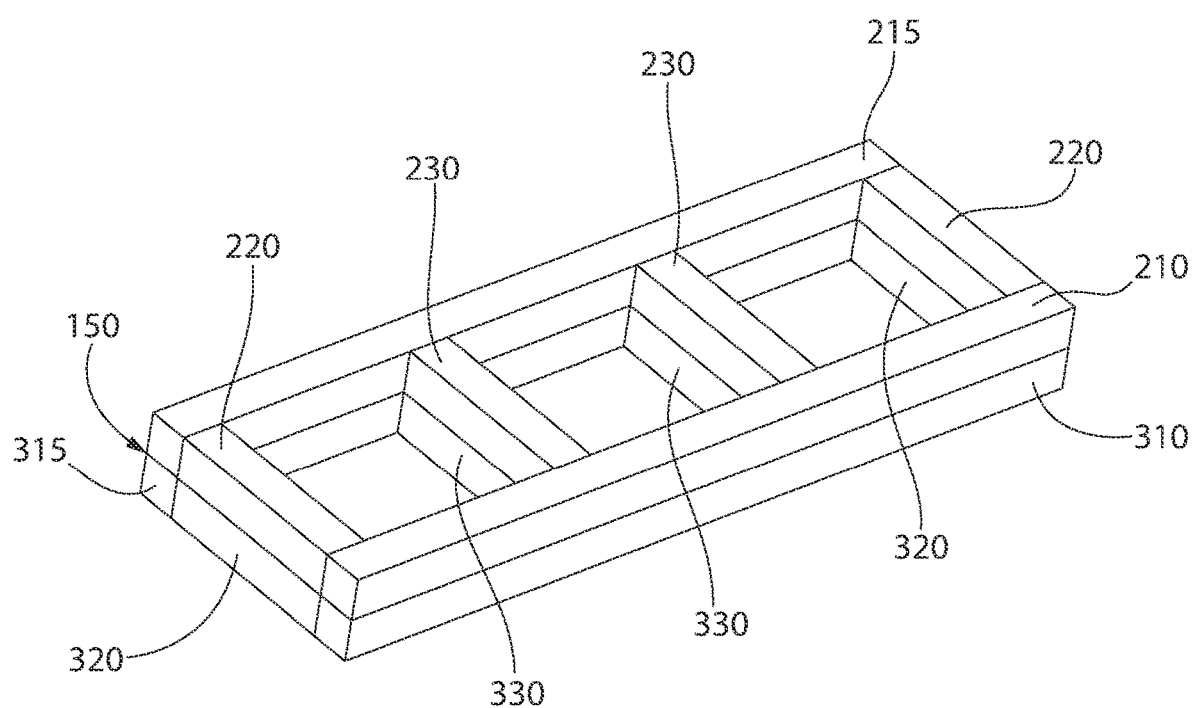
FIG. 5 is a detail view of the embodiment shown in FIG. 4 in a folded state.

FIGS. 4 and 5 show an example of an embodiment of the invention that simplifies the work needed in the field to create a frame for supporting drywall or other sheet-like material. In this example, framework 100 has two panels 200, 300 that are hinged at a folding line 150 such that panels 200, 300 can be folded into a condition in which panel 200 is positioned on top of panel 300, as shown in FIG.

5. This example provides a frame that can be constructed off-site and then quickly and easily unfolded on-site to provide a dimensionally correct framework.

The sheet-like material may be formed from a first sheet of the building material and a second sheet of the building material. The first sheet and the second sheet may be two completely separate sheets of material. In another embodiment, the first and second sheets may be formed from a single panel of building material, whereby the single panel has a V-shaped cut formed into one of the major surfaces, thereby allowing the single panel to be folded to a shape conforming to a first frame portion and a second frame portion of the frame, whereby the singe panel extends continuously from the first frame portion to the second frame portion. The V-shaped cut may be formed such that a 90 degree fold is formed on the single panel. Other fold angles may range from 30 to 170 degrees—including all angles and subranges there-between.

Panel 200 has a longitudinal member 210 and a parallel longitudinal member 215 that establish the length of panel 200. Two end transverse members 220 bridge between longitudinal members 210, 215. In this example, two interior transverse members 230 are parallel to end transverse members 220 and bridge between longitudinal members 310, 315. Similarly to panel 200, panel 300 has a longitudinal member 310 and a parallel longitudinal member 315 that establish the length of framework panel 300. Two end transverse members 320 bridge between longitudinal members 310, 315. In this example, two interior transverse members 330 are parallel to end transverse members 320 and bridge between longitudinal members 310, 315.

FIG. 5 shows framework 100 in a folded state where panel 200 is rotated relative to panel 300 about folding line 150 such that panel 200 is positioned on top of panel 300. The movement of panel 200 relative to panel 300 can be controlled by one or move hinging mechanisms. The hinging mechanism can be located at folding line 150 and be a simple hinge, or they can be located remotely from folding line 150 and/or be some other type of mechanism that permits the desired relative movement of panels 200, 300. The hinging mechanism can be configured to allow relative rotation of the panels 200, 300 through any angle of rotation. For example, as shown in FIG. 4, panels 200, 300 can rotate to a position at which they are 180 degrees from each other. In other examples, panels 200, 300 can rotate to a position in which they are more or less than 180 degrees from each other. For example, in the case of a common soffit in a building space (or other application), panels 200, 300 can be moved to a position in which they are 90 degrees from one another.

One or more locking mechanisms can be provided to lock panels 200, 300 in a desired position relative to one another. Such locking mechanisms can be of any configuration that securely holds the panels in the desired position sufficiently to allow the attachment of the drywall, or other, building panels. FIGS. 6-11 show an example of locking mechanisms in accordance with the invention.

Figure 6:
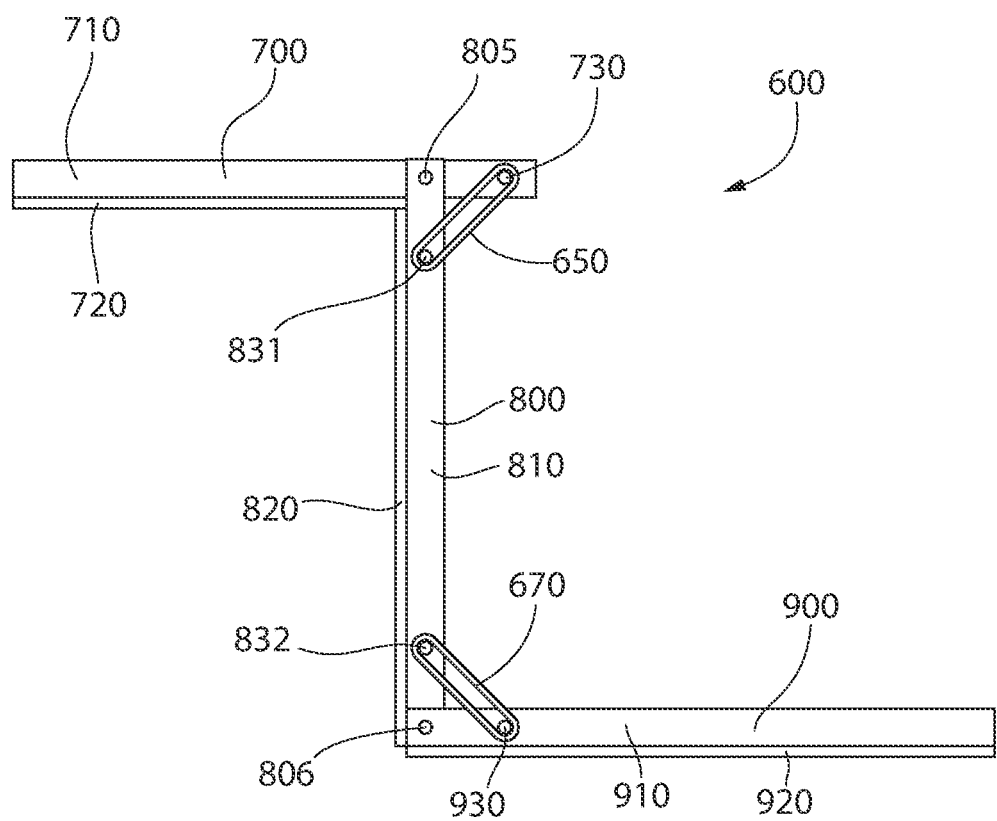
FIG. 6 is a side view of a soffit system in accordance with exemplary embodiments of the invention in a deployed state.

FIG. 6 shows an example of a framework 600 in accordance with embodiments of the invention. Framework 600 has an upper member 700 that is T-shaped in cross-section. The T-shaped cross-section is formed by a rib portion 710 and a flange portion 720 that extends laterally away from rib portion 710 on both sides of rib portion 710. While upper member 700 is shown as a T-shaped member in this example, in other examples upper member 700 has an L-shaped cross-section, a box-shaped cross-section, or another shaped cross-section. Any appropriately shaped cross-section can be used as long as it is sufficiently strong to support the drywall or other building sheet that is to be attached to framework 600.

Framework 600 has a middle member 800 that is attached to upper member 700 by a first pivoting mechanism 805. The first pivoting mechanism 805 may comprise a swiveling joint that can be, for example, a bolt, pin, rivet, or other swiveling fastener. The middle member 800 may be coupled to the upper member 700 by the first pivoting mechanism 805, which may permit the upper member 700 to rotate about a first pivoting axis relative to the middle member 800. The first pivoting mechanism 805 may permit the upper member 700 to rotate about the first pivoting axis from an undeployed state to a deployed state. The undeployed state may be a folded state compared to the deployed state.

In this example, middle member 800 is T-shaped in cross-section. The T-shaped cross-section is formed by a rib portion 810 and a flange portion 820 that extends laterally away from rib portion 810 on both sides of rib portion 810. While middle member 800 is shown as a T-shaped member in this example, in other examples middle member 800 has an L-shaped cross-section, a box-shaped cross-section, or another shaped cross-section. Any appropriately shaped cross-section can be used as long as it is sufficiently strong to support the drywall or other building sheet that is to be attached to framework 600.

Framework 600 has a lower member 900 that is attached to middle member 800 by a second pivoting mechanism 806. The second pivoting mechanism 806 may comprise a swiveling joint that can be, for example, a bolt, pin, rivet, or other swiveling fastener. The lower member 900 may be coupled to the middle member 800 by the second pivoting mechanism 806, which may permit the lower member 900 to rotate about a second pivoting axis relative to the middle member 800. The second pivoting mechanism 806 may permit the lower member 900 to rotate about the second pivoting axis from an undeployed state to a deployed state. The undeployed state may be a folded state compared to the deployed state.

In this example, lower member 900 is T-shaped in cross-section. The T-shaped cross-section is formed by a rib portion 910 and a flange portion 920 that extends laterally away from rib portion 910 on both sides of rib portion 910. While lower member 900 is shown as a T-shaped member in this example, in other examples lower member 900 has an L-shaped cross-section, a box-shaped cross-section, or another shaped cross-section. Any appropriately shaped cross-section can be used as long as it is sufficiently strong to support the drywall or other building sheet that is to be attached to framework 600.

Framework 600 is only one example of a collapsible framework in accordance with embodiments of the invention. Other examples have a different number of members and/or different shape members and/or a different relative configuration of members. For example, instead of three members 700, 800, 900, Framework 600 can have two members or more than three members. In some embodiments, members 700, 800, 900 can have different relative lengths. In some embodiments, members 700, 800, 900 do not intersect at 90 degree angles. In some embodiments members 700 and 800 intersect at a first angle and members 800 and 900 intersect at a different angle.

In some embodiments, members 700, 800, 900 can be locked in a particular relative position such that they form a particular included angle relative to each other. For example, framework 600 is locked into a configuration where upper member 700 and middle member 800 form a 90 degree angle, and middle member 800 and lower member 900 form a 270 degree angle. In this example, the framework 600 may comprise a first locking mechanism that fixes a relative position of the upper member 700 and the middle member 800 in the deployed state depicted in FIG. 6. The first locking mechanism may include a first locking member 650, a pin 730 on upper member 700, and a pin 831 on middle member 800. The framework 600 may further comprise a second locking mechanism that fixes a relative position of the lower member 900 and the middle member 800 in the deployed state depicted in FIG. 6. The second locking mechanism may include a second locking member 670, a pin 832 on middle member 800, and a pin 930 on lower member 900.

Figure 8:
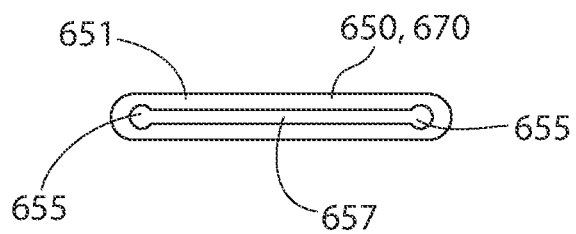
FIG. 8 is a side view of a holding mechanism in accordance with exemplary embodiments of the invention.

Locking members 650, 670 are rigid material such as metal, plastic or composite. Pins 730, 831, 832, 930 are a shoulder bolt configuration including a head of a diameter A, a large diameter shaft portion adjacent the head and having a diameter B that is less than diameter A, and a small diameter shaft portion adjacent to the large diameter shaft portion and having a diameter C that is less than diameter B. A detailed view of an example of locking member 650, 670 is shown in FIG. 8. In this example, locking member 650, 670 has a main body 651 in which a longitudinal slot 657 is located. Longitudinal slot 657 has an enlarged area 655 at each end of slot 657 for receiving pins 730, 831. The width in the transverse direction of longitudinal slot 657 is slightly larger than the small diameter shaft portion of pins 730, 831, 832, 930, but smaller than the large diameter shaft portions of pins 730, 831, 832, 930. In this example, locking members 650, 670 are curved to act as a spring such that the ends of locking members 650, 670 are urged away from members 700, 800, 900. This urging action pushes enlarged areas 655 onto the large diameter shaft portion so that members 700, 800, 900 cannot move relative to each other due to the large diameter shaft portions not being able to pass through longitudinal slot 657. In other examples, enlarged areas 655 are a slight interference fit with the large diameter shaft portions of pins 730, 831, 832, 930 such that a user can force enlarged areas 655 of locking members 650, 670 onto the large diameter shaft portions of pins 730, 831, 832, 930 to lock locking members 650, 670 in a position that prevents relative movement of members 700, 800, 900.

Figure 7:
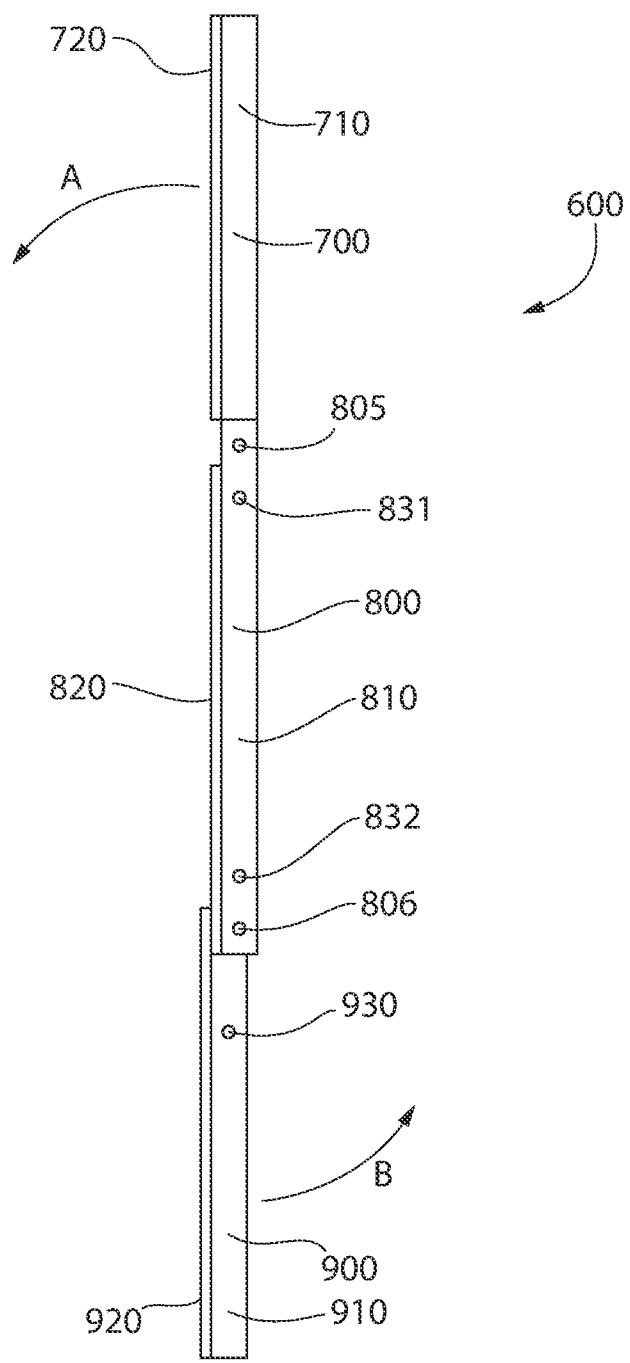
FIG. 7 is a side view of the embodiment shown in FIG. 6 in a flat, non-deployed state.

FIG. 7 shows frame 600 in a flat condition that can be used for shipping. Once on the jobsite, frame 600 can be folded to the desired configuration to act as a support for a soffit or other building surface. To provide the deployed configuration shown in FIG. 6, upper member 700 is rotated in the direction of Arrow A to a position in which upper member 700 forms a 90 degree angle with middle member 800, and lower member 900 is rotated in the direction of Arrow B to a position in which lower member 900 forms a 270 degree angle with middle member 800.

The example shown in FIG. 6 uses locking members 650, 670 of a given length that result in frame 600 having included angles of 90 degrees and 270 degrees. Using locking members of other lengths results in different angles between members 700, 800, 900.

Figure 9:
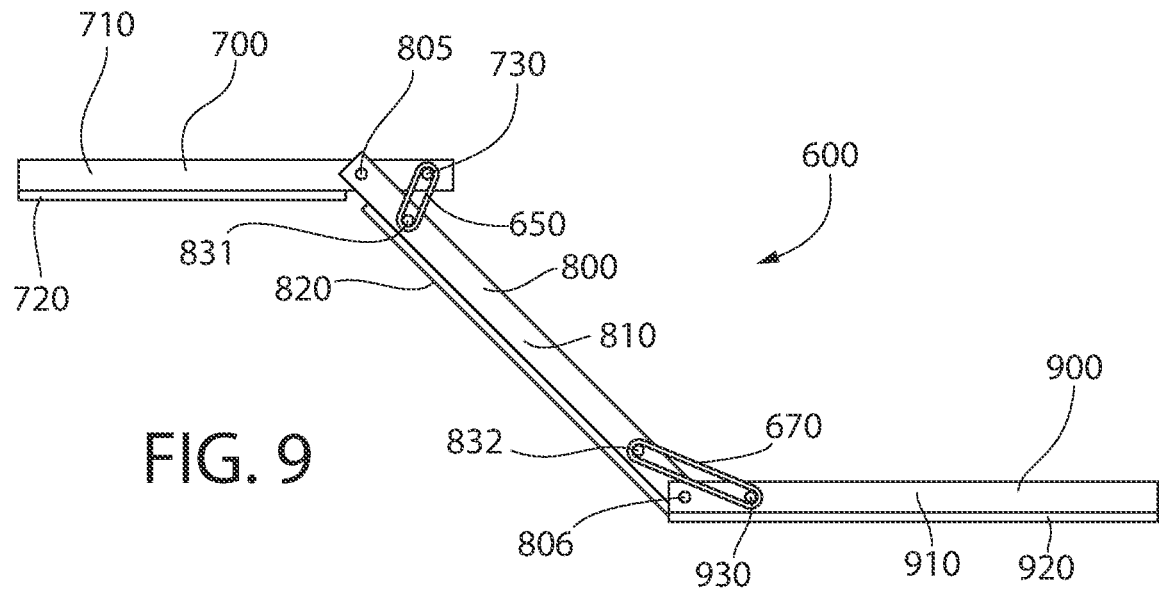
FIG. 9 is a side view of the soffit system of FIG. 6 in an alternate deployed state.

FIG. 9 shows an example where the frame 600 of FIG. 7 is deployed such that upper member 700 forms a 135 degree angle with middle member 800 and middle member 800 forms a 225 degree angle with lower member 900. This configuration is the result of locking member 650 being shorter in the longitudinal direction than the locking member 650 shown in FIG. 6, and locking member 670 being longer in the longitudinal direction than the locking member 670 shown in FIG. 6.

Figure 10:
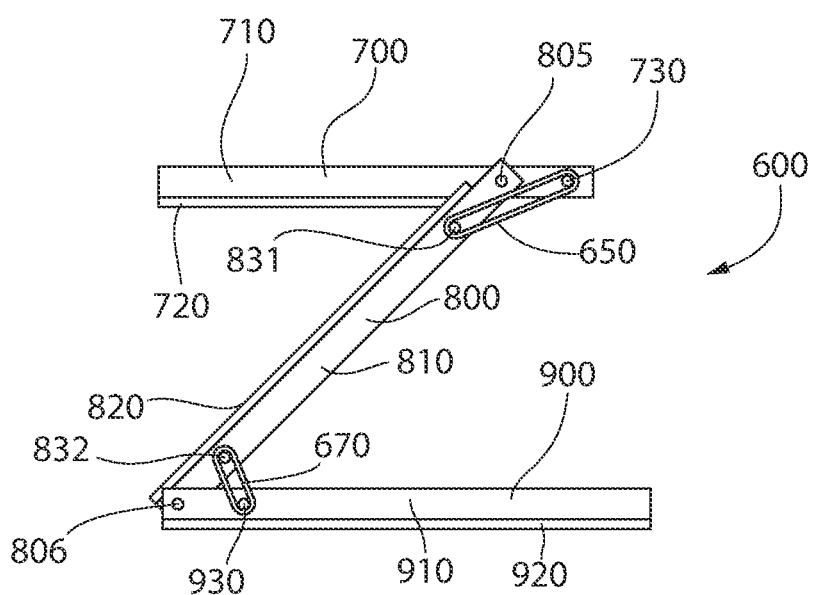
FIG. 10 is a side view of the soffit system of FIG. 6 in an alternate deployed state.

FIG. 10 shows an example where the frame 600 of FIG. 7 is deployed such that upper member 700 forms a 45 degree angle with middle member 800 and middle member 800 forms a 315 degree angle with lower member 900. This configuration is the result of locking member 650 being longer in the longitudinal direction than the locking member 650 shown in FIG. 6, and locking member 670 being shorter in the longitudinal direction than the locking member 670 shown in FIG. 6.

Figure 11:
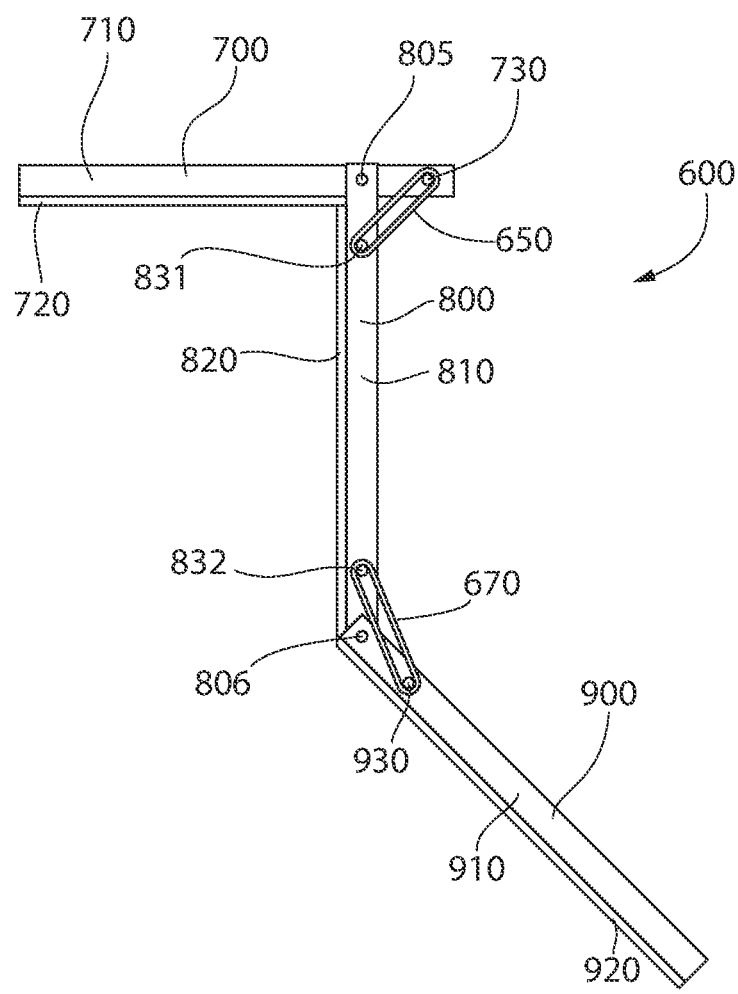
FIG. 11 is a side view of the soffit system of FIG. 6 in an alternate deployed state.

FIG. 11 shows an example where the frame 600 of FIG. 7 is deployed such that upper member 700 forms a 90 degree angle with middle member 800 and middle member 800 forms a 225 degree angle with lower member 900. This configuration is the result of locking member 650 being the same length in the longitudinal direction than the locking member 650 shown in FIG. 6, and locking member 670 being longer in the longitudinal direction than the locking member 670 shown in FIG. 6.

Although FIGS. 6 and 8-11 show various deployed configurations, it is noted that any number of deployed configurations are possible using locking members of different lengths. In addition, fewer or more than three members 700, 800, 900 can be used to form different shaped structures. In some cases, a 180 degree angle can be provided between two adjacent members to for a flat section in the structure.

Figure 12:
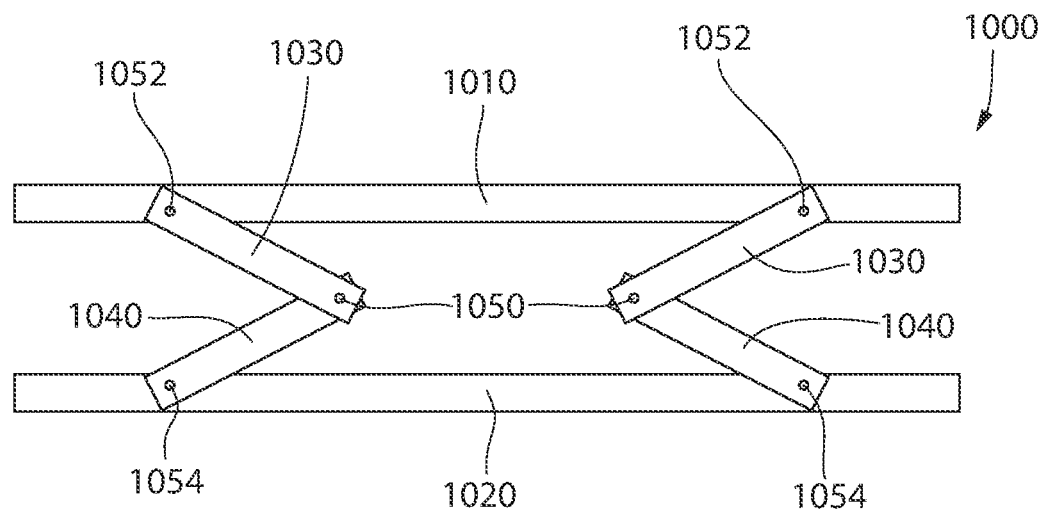
FIG. 12 is a top view of a soffit system in accordance with exemplary embodiments of the invention in a folded, non-deployed state.
Figure 13:
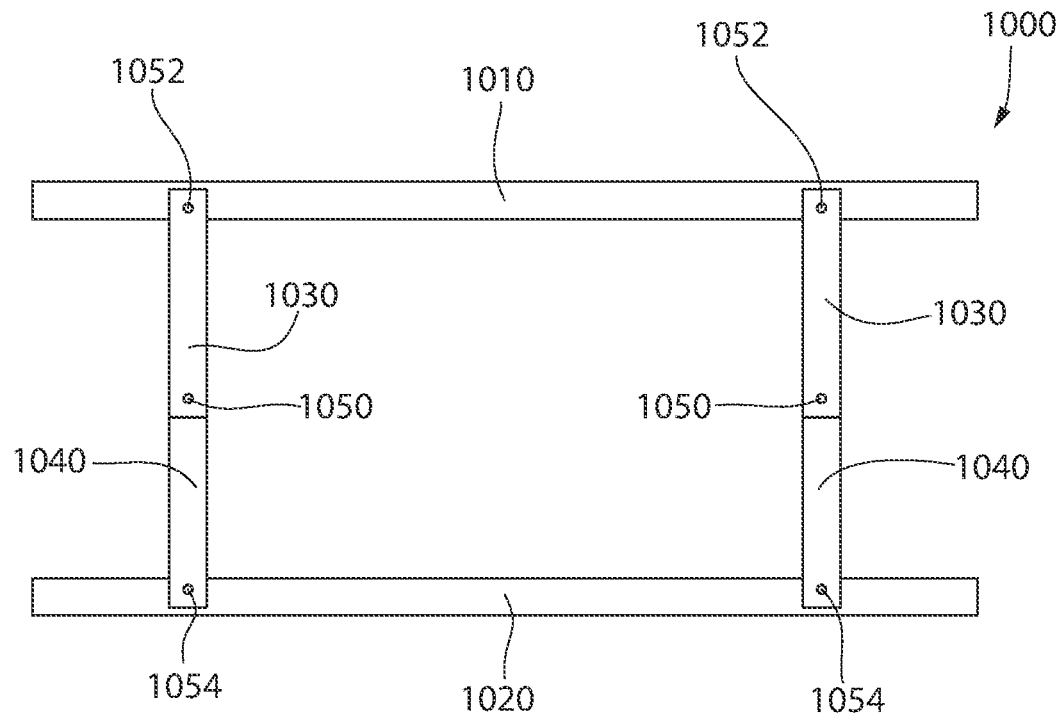
FIG. 13 is a top view of the soffit system of FIG. 12 in a deployed state.
Figure 14:
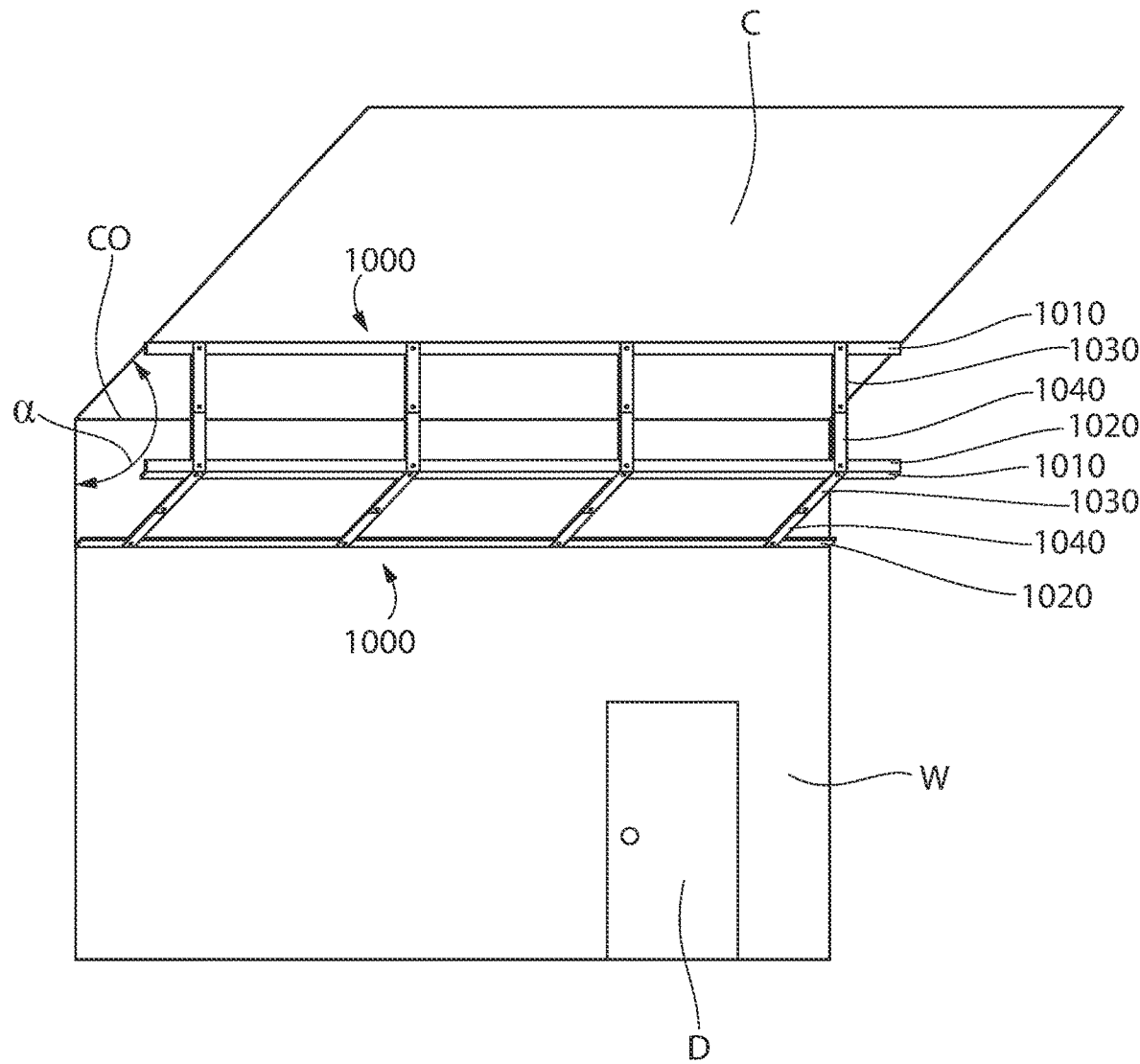
FIG. 14 is a perspective view of an occupiable building space having a soffit structure using the soffit system of FIG. 12.

FIGS. 12-14 show another embodiment of the invention that involves collapsible members within a flat panel structure. FIG. 12 shows a framework 1000 having two rigid members 1010, 1020. Rigid members 1010, 1020 are attached to each other by two collapsible members, each having a first member 1030 (also referred to as a "first portion") and a second member 1040 (also referred to as a "second portion"). First member 1030 is pivotably attached to second member 1040 by a pin 1050 (also referred to as a "first pin" 1050). First member 1030 is pivotably attached to rigid member 1010 by a pin 1052 (also referred to as a "second pin" 1052), and second member 1040 is pivotably attached to rigid member 1020 by a pin 1054 (also referred to as a "third pin" 1054).

FIG. 12 is an example of framework 1000 in a collapsed state where the collapsible members are folded so that rigid members 1010 and 1020 are relatively close to each other. This collapsed state can be preferable for transport to the job site. FIG. 13 shows framework 1000 is a deployed state where rigid members 1010 and 1020 are at a maximum distance apart. The state shown in FIG. 13 is just one of many possible deployed states. For example, a deployed state between that shown in FIG. 12 and that shown in FIG. 13 can also be used. Further, the state shown in FIG. 12 can be a deployed state and a state in which rigid members 1010, 1020 are closer together, or even touching, can be the collapsed state.

FIG. 14 shows an example of two frameworks 1000 installed to form a soffit and facia in an occupiable space in a building having a wall W, a ceiling C, and a door D in wall W. Ceiling C makes an angle α with wall W at a corner CO. In this case the two frameworks 1000 cover corner CO with a box structure in which the two frameworks 1000 form a 90 degree angle. The two frameworks 1000 can be attached to one another and to wall W and ceiling C using screws, clips, or some other fastener. In other examples, more than two frameworks 1000 are used. In other examples, frameworks 1000 are attached to ceiling C, wall W, and/or each other at angles other than 90 degrees. In other examples, one framework 1000 is fully deployed such that first members 1030 are aligned with second members 1040, and another framework 1000 is partially deployed such that first members 1030 are not aligned with second members 1040.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention.

What is claimed is:

1. A method of forming a soffit from a collapsible structural frame, the method comprising:
   providing the collapsible structural frame comprising a first frame portion, a second frame portion coupled to the first frame portion, and a third frame portion coupled to the second frame portion;
   pivoting the first frame portion of the collapsible structural frame relative to the second frame portion of the collapsible structural frame until the first frame portion extends perpendicularly from a first side of the second frame portion to alter the first frame portion into a first deployed state;
   locking the first frame portion to the second frame portion to fix the first frame portion in the first deployed state;
   pivoting the third frame portion of the collapsible structural frame relative to the second frame portion of the collapsible structural frame until the third frame portion extends perpendicularly from a second side of the second frame portion that is opposite the first side of the first frame portion to alter the third frame portion into a second deployed state; and
   locking the third frame portion to the second frame portion to fix the third frame portion in the second deployed state, thereby resulting in the first frame portion, the second frame portion, and the third frame portion forming a soffit frame;
   attaching the soffit frame to at least one building structure; and
   wherein prior to pivoting, the collapsible structural frame is in a flat state in which the first, second, and third frame portions extend along the second reference plane in a linear arrangement in which the first frame portion extends linearly beyond a first end of the second frame portion in a first direction and the third frame portion extends linearly beyond a second end of the second frame portion in a second direction opposing the first direction along the second reference plane.

2. The method according to claim 1 further comprising:
   the first frame portion extending along a first reference plane and having a first surface on a first side of the first reference plane and a second surface on a second side of the first reference plane;
   the second frame portion extending along a second reference plane and having a first surface on a first side of the second reference plane and a second surface on a second side of the second reference plane;
   the third frame portion extending along a third reference plane and having a first surface on a first side of the third reference plane and a second surface on a second side of the third reference plane;
   wherein prior to pivoting the first and third frame portions relative to the third frame portion, the collapsible structural frame is in a flat state and the first sides of the first, second, and third frame portions face in a same direction; and
   wherein when the first frame portion is in the first deployed state a first 90° angle is formed between the first side of the first frame portion and the first side of the second frame portion and when the third frame portion is in the second deployed state a second 90° angle is formed between the first side of the third frame portion and the first side of the second frame portion.

3. The method according to claim 2 further comprising:
   attaching a first sheet of building material to the first surface of the first frame portion to form a first portion of a multi-planar surface;
   attaching a second sheet of building material to the first surface of the second frame portion to form a second portion of the multi-planar surface; and
   attaching a third sheet of building material to the first surface of the third frame portion to form a third portion of the multi-planar surface.

4. The method according to claim 1 further comprising:
   attaching a first sheet of building material to a first surface of the first frame portion;
   attaching a second sheet of building material to a first surface of the second frame portion;
   attaching a third sheet of building material to a first surface of the third frame portion; and
   wherein the first surface of the first frame portion is perpendicular to the first surface of the second frame portion and the first surface of the third frame portion is perpendicular to the first surface of the second frame portion.

5. A method of forming a soffit, the method comprising:
   providing a structural frame in a flat state, the structural frame comprising a first frame portion, a second frame portion connected to the first portion, and a third frame portion connected to the second frame portion;
   pivoting the first frame portion relative to the second frame portion about a first pivot axis and locking the first frame portion to the second frame portion in a first deployed state;
   pivoting the third frame portion relative to the second frame portion about a second pivot axis and locking the third frame portion to the second frame portion in a second deployed state, thereby resulting in the first frame portion, the second frame portion, and the third frame portion forming a soffit frame;
   attaching the soffit frame to at least one building structure; and
   attaching at least one building panel to each of the first frame portion, the second frame portion, and the third frame portion to form the soffit.

6. The method according to claim 5 wherein when the structural frame is in the flat state, the first frame portion, the second frame portion, and the third frame portion are colinear with each other, and when the first frame portion is in the first deployed state and the third frame portion is the second deployed state, the first frame portion and the third frame portion are non-colinear with the second frame portion.

7. The method according to claim 6 wherein the second frame portion comprises a first side and a second side opposite the first side, and wherein after pivoting the first frame portion relative to the second frame portion and pivoting the third frame portion relative to the second frame portion, the first frame portion extends from the first side of the second frame and the third frame portion extends from the second side of the second frame portion.

8. The method according to claim 6 wherein the first frame portion and the third frame portion are angled at an acute angle relative to the second frame portion while in the first deployed state and second deployed state.

9. The method according to claim 6 wherein the first frame portion and the third frame portion are angled at an obtuse angle relative to the second frame portion while in the first deployed state and second deployed state.

10. The method according to claim 5 wherein each of the first frame portion, the second frame portion, and the third frame portion comprise a rib portion and a flange portion connected to the rib portion at one side to form a T-shaped cross section.

11. The method according to claim 10 wherein the building panels are attached to the first frame portion, the second frame portion, and the third frame portion at the flange portions of the first frame portion, the second frame portion, and the third frame portion.

12. The method according to claim 5 wherein the building structure is a wall.

13. The method according to claim 5 wherein the building structure is a ceiling.

14. The method according to claim 5 wherein each of the building panels are drywall sheets.

15. The method according to claim 5 wherein the structural frame further comprises a first locking mechanism and a second locking mechanism wherein the first locking mechanism locks the first frame portion to the second frame portion in a first deployed state and the second locking mechanism locks the third frame into the second frame in a second deployed state.

16. The method according to claim 15 wherein the first locking mechanism comprises a first annular locking member, a first pin extending from the first frame portion, and a second pin extending from the second frame portion, the second locking mechanism comprises a second annular locking member, a third pin extending from the third frame portion and a fourth pin extending from the second frame portion opposite the second pin, wherein locking the first frame portion to the second frame portion comprises looping the first annular locking member around the first pin and the second pin and locking the first frame portion to the second frame portion comprises looping the second annular locking member around the third pin and the fourth pin.

17. A method of forming a soffit, the method comprising:
providing a structural frame in a flat state, the structural frame comprising a first frame portion and a second frame portion connected to the first portion;
pivoting the first frame portion relative to the second frame portion about a pivot axis and locking the first frame portion to the second frame portion in a deployed state, thereby resulting in the first frame portion and the second frame portion forming a soffit frame;
attaching the soffit frame to at least one building structure; and
attaching at least one building panel to each of the first frame portion and the second frame portion to form the soffit.

18. The method according to claim 17 wherein when the structural frame is in the flat state, the first frame portion and the second frame portion are colinear with each other and when the first frame portion is in the deployed state, the first frame portion is non-colinear with the second frame portion.

19. The method according to claim 18 wherein the first frame portion is angled at a perpendicular angle relative to the second frame portion while in the deployed state.

20. The method according to claim 17 wherein the at least one building panel comprises a major surface and a V-shaped cut formed into the major surface, whereby the step for attaching the at least one building panel to each of the first frame portion and the second frame portion to form the soffit further comprises folding the at least one building panel over the V-shaped cut.

\* \* \* \* \*